(12) United States Patent
Nakayama

(10) Patent No.: US 12,494,487 B2
(45) Date of Patent: Dec. 9, 2025

(54) ELECTRODE FOR NONAQUEOUS ELECTROLYTE SECONDARY BATTERY AND NONAQUEOUS ELECTROLYTE SECONDARY BATTERY

(71) Applicant: Panasonic Intellectual Property Management Co., Ltd., Osaka (JP)

(72) Inventor: Takahito Nakayama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 586 days.

(21) Appl. No.: 17/788,141

(22) PCT Filed: Oct. 29, 2020

(86) PCT No.: PCT/JP2020/040605
§ 371 (c)(1),
(2) Date: Jun. 22, 2022

(87) PCT Pub. No.: WO2021/131313
PCT Pub. Date: Jul. 1, 2021

(65) Prior Publication Data
US 2023/0029595 A1  Feb. 2, 2023

(30) Foreign Application Priority Data
Dec. 26, 2019 (JP) .................... 2019-236845

(51) Int. Cl.
*H01M 4/02* (2006.01)
*H01M 4/62* (2006.01)

(52) U.S. Cl.
CPC ........ *H01M 4/62* (2013.01); *H01M 2004/021* (2013.01); *H01M 4/623* (2013.01); *H01M 4/625* (2013.01)

(58) Field of Classification Search
CPC ........ H01M 4/62; H01M 4/623; H01M 4/625; H01M 2004/021; H01M 2004/028; H01M 4/131; Y02E 60/10
(Continued)

(56) References Cited

U.S. PATENT DOCUMENTS

2010/0248035 A1   9/2010 Minami et al.
2015/0179998 A1   6/2015 Kagami et al.
(Continued)

FOREIGN PATENT DOCUMENTS

CN        105917499 A    8/2016
EP         3179540 A1    6/2017
(Continued)

OTHER PUBLICATIONS

C. Heubner, U. Langklotz, C. Lämmel, M. Schneider, A. Michaelis, Electrochemical single-particle measurements of electrode materials for Li-ion batteries: Possibilities, insights and implications for future development, Electrochimica Acta, 2020 (Year: 2020).*
(Continued)

*Primary Examiner* — Christian Roldan
(74) *Attorney, Agent, or Firm* — WHDA, LLP

(57) ABSTRACT

This electrode for a nonaqueous electrolyte secondary battery comprises a current collector, an active material layer formed on the current collector, and a filler particle aggregate present in an island shape on a surface of the active material layer, wherein said filler particles are compound particles containing at least one element selected from phosphorus, silicon, boron, nitrogen, potassium, sodium, and bromine, and the transformation point at which the same transforms from a solid phase to a liquid phase or undergoes thermal decomposition is in the range of 180-1000° C.

7 Claims, 2 Drawing Sheets

(58) Field of Classification Search
USPC .......................................................... 429/217
See application file for complete search history.

(56) References Cited

U.S. PATENT DOCUMENTS

| | | | |
|---|---|---|---|
| 2016/0336614 A1 | 11/2016 | Hatta et al. | |
| 2017/0040599 A1 | 2/2017 | Kamo et al. | |
| 2018/0294513 A1* | 10/2018 | Hwang | H01M 4/134 |
| 2019/0334167 A1 | 10/2019 | Kamo et al. | |
| 2021/0242464 A1* | 8/2021 | Hayashi | H01M 4/366 |

FOREIGN PATENT DOCUMENTS

| | | | |
|---|---|---|---|
| JP | 2005276503 A | * | 10/2005 |
| JP | 2009-164014 A | | 7/2009 |
| JP | 2010-192365 A | | 9/2010 |
| JP | 2010-238464 A | | 10/2010 |
| JP | 2013-054909 A | | 3/2013 |
| JP | 2015-138598 A | | 7/2015 |
| JP | 2017-534138 A | | 11/2017 |
| JP | 6249399 B2 | | 12/2017 |

OTHER PUBLICATIONS

Office Action dated Dec. 25, 2023, issued in counterpart CN Application No. 202080089406.5, with partial English translation. (8 pages).
International Search Report dated Dec. 22, 2020, issued in counterpart application No. PCT/JP2020/040605, w/ English translation (6 pages).
Written Opinion dated Dec. 22, 2020, issued in counterpart application No. PCT/JP2020/040605 (4 pages).

* cited by examiner

ELECTRODE FOR NONAQUEOUS ELECTROLYTE SECONDARY BATTERY AND NONAQUEOUS ELECTROLYTE SECONDARY BATTERY

CROSS REFERENCE TO RELATED APPLICATIONS

This application is a National Stage Application filed under 35 U.S.C. § 371 of International Application No. PCT/JP2020/040605 filed on Oct. 29, 2020 which claims the benefit of priority under 35 U.S.C. § 119(a) of Japanese Patent Application No. 2019-236845 filed on Dec. 26, 2019, the contents of which are incorporated herein by reference.

TECHNICAL FIELD

The present disclosure relates to an electrode for a non-aqueous electrolyte secondary battery and a non-aqueous electrolyte secondary battery.

BACKGROUND

In recent years, as a secondary battery having high output and high energy density, a non-aqueous electrolyte secondary battery that performs charging and discharging by moving lithium ions between a positive electrode and a negative electrode has been widely used.

There is a nail penetration test as a safety evaluation test for confirming resistance to an internal short circuit of a battery. The nail penetration test is, for example, a test in which a nail penetrates into a battery to simulatively generate an internal short circuit and a degree of heat generation is examined to confirm safety of the battery. It is important to suppress the heat generation of the battery at the time of the nail penetration from the viewpoint of securing the safety of the battery.

For example, Patent Literature 1 discloses a technique for suppressing heat generation of a battery in a nail penetration test by disposing a coating layer containing a functional material selected from a phosphorus-containing compound, a nitrogen-containing compound, and an inorganic silicon compound on a surface of an electrode plate of a positive electrode or a negative electrode.

For example, Patent Literature 2 discloses a technique for suppressing an increase in temperature at the time of abnormal heat generation of a battery by disposing an intermediate layer containing polyphosphate between a positive electrode and a negative electrode.

CITATION LIST

Patent Literature

Patent Literature 1: JP 2017-534138 A
Patent Literature 2: JP 6249399 B

SUMMARY

When a coating layer of a functional material or an intermediate layer of polyphosphate is disposed on a surface of an electrode plate as in Patent Literatures 1 and 2, there is a problem that these layers become resistors and resistance of the battery is increased.

An electrode for a non-aqueous electrolyte secondary battery according to an aspect of the present disclosure includes a current collector, an active material layer that is formed on the current collector, and an aggregate of filler particles that is present in an island shape on a surface of the active material layer. The filler particles are compound particles containing at least one of phosphorus, silicon, boron, nitrogen, potassium, sodium, and bromine, and a transformation point of the filler particle at which the filler particle is transformed from a solid phase into a liquid phase or is thermally decomposed is in a range of 180° C. to 1,000° C.

A non-aqueous electrolyte secondary battery according to an aspect of the present disclosure includes a positive electrode and a negative electrode, and at least one of the positive electrode and the negative electrode is the electrode for a non-aqueous electrolyte secondary battery.

According to the present disclosure, it is possible to suppress heat generation of a battery in a nail penetration test while suppressing an increase in battery resistance.

DESCRIPTION OF EMBODIMENTS

Hereinafter, embodiments of the present disclosure will be described with reference to the drawings.

Figure 1:
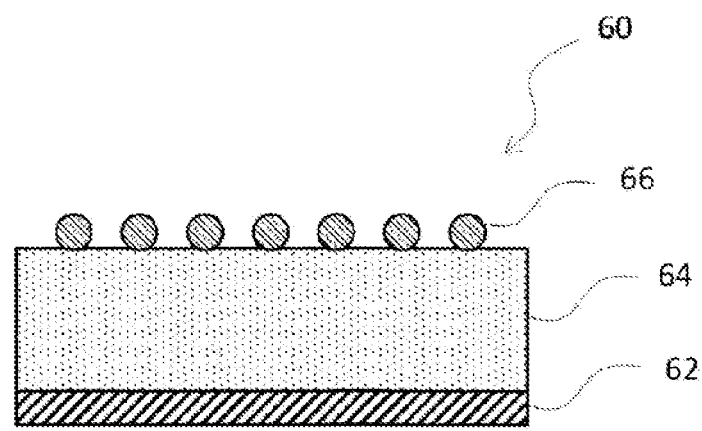
FIG. 1 is a schematic cross-sectional view illustrating an example of a configuration of an electrode according to the present embodiment.

FIG. 1 is a schematic cross-sectional view illustrating an example of a configuration of an electrode according to the present embodiment. An electrode 60 illustrated in FIG. 1 is an electrode for a non-aqueous electrolyte secondary battery, and is applied to at least one of a positive electrode and a negative electrode of a non-aqueous electrolyte secondary battery.

The electrode 60 illustrated in FIG. 1 includes a current collector 62, an active material layer 64 that is formed on the current collector 62, and an aggregate 66 of filler particles that is present in an island shape on a surface of the active material layer 64. That is, a surface structure of the electrode 60 is a sea-island structure having a sea region of the surface of the active material layer and an island region of the aggregate 66 of filler particles. The aggregate 66 is an aggregation of a single or a plurality of filler particles.

The filler particles constituting the aggregate 66 are compound particles containing at least one of phosphorus, silicon, boron, nitrogen, potassium, sodium, and bromine, and a transformation point of the filler particle at which the filler particle is transformed from a solid phase into a liquid phase or is thermally decomposed is in a range of 180° C. to 1,000° C.

By using the electrode for a non-aqueous electrolyte secondary battery according to the present embodiment, an increase in battery temperature in a nail penetration test is suppressed. This mechanism is not sufficiently clear, but the following is presumed. Due to heat generation of the battery at the time of the nail penetration test, that is, heat generation of the battery when a nail penetrates into the battery and an internal short circuit is simulatively generated, the filler particles constituting the aggregate 66 are transformed from a solid phase into a liquid phase and flow on the surface of the active material layer 64, or extend on the surface of the active material layer 64 by thermal decomposition and become a coating film covering the surface of the active material layer 64. The coating film functions as a resistor component, and thus, the amount of short circuit current flowing between the positive and negative electrodes through the nail is suppressed. As a result, an increase in battery temperature in the nail penetration test is also suppressed. The formation of the coating film after the transformation of the filler particles into the liquid phase depends on the type of filler particle, and is performed by, for example, an increase in temperature higher than a melting point of a filler material, a thermal fusion reaction, a dehydration condensation reaction, a thermal polymerization reaction, or the like.

In addition, according to the electrode for a non-aqueous electrolyte secondary battery according to the present embodiment, an increase in battery resistance is suppressed. In normal use in which abnormal heat generation does not occur in a battery, since the aggregate 66 of filler particles is a material having low lithium ion conductivity, in a case where the aggregate 66 is present in a layer shape, movement of lithium ions is inhibited and an increase in battery resistance is caused. However, in the present embodiment, since the aggregate 66 has an island shape, a gap exists between the aggregates 66, and ions such as lithium ions can easily pass through the gap. Therefore, it is considered that since lithium ions smoothly move between the positive and negative electrodes during charging and discharging of the battery as compared with a case where the entire surface of the active material layer 64 is covered with a coating layer of filler particles without a gap, an increase in battery resistance is suppressed.

Hereinafter, a constituent material of the electrode 60 will be described in more detail.

The filler particles are compound particles containing at least one of phosphorus, silicon, boron, nitrogen, potassium, sodium, and bromine and are not particularly limited as long as a transformation point of the filler particle at which the filler particle is transformed from a solid phase into a liquid phase or is thermally decomposed is in a range of 180° C. to 1,000° C. A material of the filler particle include a phosphoric acid compound, a silicic acid compound, a boric acid compound, a melamine compound, a potassium salt compound, and a sodium salt compound. Examples of the phosphoric acid compound include metal phosphates such as phosphate-lithium salt, phosphate-sodium salt, phosphate-potassium salt, phosphate-calcium salt, phosphate-magnesium salt, and aluminum phosphate, condensed phosphates such as ammonium polyphosphate, sodium tripolyphosphate, and melamine polyphosphate, and phosphoric acid esters such as trimethyl phosphate and triphenyl phosphate. Examples of the boric acid compound include metal borates such as borate-sodium salt, borate-potassium salt, borate-calcium salt, borate-magnesium salt, aluminum borate, and melamine borate, boric acid esters such as trimethyl borate, boron oxide, and condensed borate. Examples of the silicic acid compound include metal silicate such as silicate-sodium salt, silicate-potassium salt, silicate-calcium salt, silicate-magnesium salt, silicate-barium salt, and silicate-manganese salt. Examples of the melamine compound include melamine cyanurate, melamine pyrophosphate, ethylene dimelamine, trimethylene dimelamine, tetramethylene dimelamine, hexamethylene dimelamine, and 1,3-hexylene dimelamine. Examples of the potassium salt compound include potassium pyrosulfate ($K_2S_2O_7$), potassium citrate monohydrate ($C_6H_5K_3O_7 \cdot H_2O$), and potassium carbonate. Examples of the sodium salt compound include sodium carbonate. Among them, melamine polyphosphate, ammonium polyphosphate, sodium tripolyphosphate, sodium silicate, sodium borate, potassium citrate monohydrate, lithium metaphosphate, potassium dihydrogen phosphate, melamine cyanurate, potassium pyrosulfate, boron oxide, ethylene-1,2-bis(pentabromophenyl), ethylenebistetrabromophthalimide, potassium carbonate, and sodium carbonate are preferable.

The transformation point of the filler particle may be in a range of 180° C. to 1,000° C. and is preferably in a range of 250° C. to 600° C. so that the filler particle is appropriately transformed from a solid phase into a liquid phase or is thermally decomposed due to heat generation of the battery in the nail penetration test.

A covering rate of the aggregate 66 to the surface of the active material layer 64 is preferably 90% or less, and more preferably 65% or less, from the viewpoint of suppressing an increase in battery resistance. In addition, the covering rate of the aggregate 66 to the surface of the active material layer 64 is preferably 5% or more from the viewpoint of suppressing an increase in battery temperature in the nail penetration test. As the covering rate is increased, the formation time of the coating layer covering the surface of the active material layer 64 during heat generation of the battery is shortened, but an optimum configuration is required according to the purpose because the battery resistance is increased. The covering rate of the aggregate 66 is calculated as follows.

The covering rate is determined by performing element mapping of the electrode surface by energy dispersive X-ray spectrometry (SEM-EDX) or the like. For example, a ratio of an area of the island region to a total area of the island region and the sea region is calculated by distinguishing the island region of the aggregate 66 and the sea region of the surface of the active material layer by element mapping. As an accuracy of the element mapping, when there is an uncovered region of about 2 μm square, it is possible to discriminate between the sea region and the island region.

The number of the aggregates 66 having an area of 1,000 μm² or less is preferably 80% or more and preferably 90% or more with respect to the total number of the aggregates 66. As the number of the aggregates 66 having an area of 1,000 μm² or less is increased, the number of the gaps between the aggregates 66, which are paths through which ions such as lithium ions easily pass, is increased in a wide range in a more uniform form, and thus, an increase in battery resistance can be suppressed.

The number of the aggregates 66 is preferably 100 or more and more preferably 200 or more per 1 mm². As the amount of the filler particles constituting the aggregate 66 is increased, the surface of the active material layer 64 is quickly covered by transformation of the filler particle from a solid phase into a liquid phase or thermal decomposition due to the heat generation of the battery at the time of the nail penetration test, and thus, an increase in battery temperature in the nail penetration test can be effectively suppressed.

An average particle diameter of the filler particles constituting the aggregate 66 is preferably 0.1 μm to 20 μm, and is more preferably in a range of 0.5 μm to 3 μm. The average particle diameter of the filler particles is determined as follows. First, 20 filler particles are randomly selected from an SEM image of the electrode surface. Next, grain boundaries of the selected 20 filler particles are observed, an outer shape of the filler particle is specified, an area of each of the 20 filler particles is determined, and the average particle diameter of the filler particles is calculated from an average value thereof.

The aggregate 66 may contain a binder in addition to the filler particles described above. By containing the binder, a binding property between the filler particles or a binding property between the filler particles and the current collector 62 can be improved. The binder is not particularly limited, and examples thereof include polyvinylidene fluoride (PVdF), ethylene dimethacrylate, allyl methacrylate, t-dodecyl mercaptan, α-methylstyrene dimer, and methacrylic acid. Polyvinylidene fluoride (PVdF), ethylene dimethacrylate, allyl methacrylate, t-dodecyl mercaptan, α-methylstyrene dimer, and methacrylic acid can allow the electrode 60 to adhere to a separator 13 by applying a pressure and/or heat to the aggregate 66. In addition, the aggregate 66 may contain compound particles in addition to the filler particles described above. Examples of the compound particles in addition to the filler particles described above include inorganic particles formed of alumina, boehmite, titania, and the like.

In a case where the electrode 60 is used as a positive electrode, as the current collector 62 to be a positive electrode current collector, for example, a foil of a metal stable in a potential range of the positive electrode, such as aluminum, a film in which the metal is disposed on a surface layer, or the like can be used. In addition, it is preferable that the active material layer 64 to be a positive electrode active material layer contains a positive electrode active material and contains a conductive agent or a binder.

Examples of the positive electrode active material include lithium-transition metal composite oxides. Specifically, lithium cobaltate, lithium manganate, lithium nickelate, lithium nickel manganese composite oxide, lithium nickel cobalt composite oxide, and the like can be used, and Al, Ti, Zr, Nb, B, W, Mg, Mo, and the like may be added to these lithium-transition metal composite oxides.

As the conductive agent, carbon powders such as carbon black, acetylene black, Ketjen black, and graphite may be used alone or in combination of two or more thereof.

Examples of the binder include a fluorine-based resin such as polytetrafluoroethylene (PTFE) or polyvinylidene fluoride (PVdF), polyacrylonitrile (PAN), a polyimide-based resin, an acrylic resin, and a polyolefin-based resin. These binders may be used alone or in combination of two or more thereof.

An example of a method for producing a positive electrode will be described. First, a positive electrode mixture slurry containing a positive electrode active material, a binder, a conductive agent, a solvent, and the like is applied onto a positive electrode current collector, and the coating film is dried and then compressed, thereby forming a positive electrode active material layer on the positive electrode current collector. Next, a filler slurry containing filler particles, a binder, a solvent, and the like is prepared. Then, the prepared filler slurry is sprayed, dropped, transferred, or applied to the positive electrode active material layer, and drying is performed to form an aggregate of filler particles that is present in an island shape on a surface of the positive electrode active material layer. Examples of the solvent contained in the slurry include water, N-methyl-2-pyrrolidone (NMP), and ethanol.

The island-shaped aggregate is obtained by, for example, adjusting the amounts of the filler particles and the solvent contained in the filler slurry and controlling the spray amount, the dropping amount, or the applied amount of the filler slurry. In addition, the island-shaped aggregate can also be obtained by, for example, disposing a masking sheet or the like provided with a plurality of through-holes having a predetermined size on the positive electrode active material layer, and spraying, dropping, or applying the filler slurry from above the disposed masking sheet.

In a case where the electrode 60 is used as a negative electrode, as the current collector 62 to be a negative electrode current collector, for example, a foil of a metal stable in a potential range of the negative electrode, such as copper, a film in which the metal is disposed on a surface layer, or the like can be used. In addition, it is preferable that the active material layer 64 to be a negative electrode active material layer contains a negative electrode active material and contains a binder and the like.

As the negative electrode active material, a carbon material capable of occluding and releasing lithium ions can be used, and in addition to graphite, non-graphitizable carbon, graphitizable carbon, fibrous carbon, coke, carbon black, and the like can be used. Furthermore, as a non-carbon-based material, silicon, tin, and a metal or an oxide mainly containing silicon and tin can be used.

Examples of the binder include a fluorine-based resin, PAN, a polyimide-based resin, an acrylic resin, a polyolefin-based resin, styrene-butadiene rubber (SBR), nitrile-butadiene rubber (NBR), carboxymethyl cellulose (CMC) or a salt thereof, polyacrylic acid (PAA) or a salt thereof (PAA-Na, PAA-K, and the like, or a partially neutralized salt may be used), and polyvinyl alcohol (PVA). These binders may be used alone or in combination of two or more thereof.

An example of a method for producing a negative electrode will be described below. First, a negative electrode mixture slurry containing a negative electrode active material, a binder, a solvent, and the like is applied onto a negative electrode current collector, and the coating film is dried and then compressed, thereby forming a negative electrode active material layer on the negative electrode current collector. Next, a filler slurry containing filler particles, a binder, a solvent, and the like is sprayed, dropped, or applied to the negative electrode active material layer, and drying is performed to form an aggregate of filler particles that is present in an island shape on a surface of the negative electrode active material layer. A method for obtaining an island-shaped aggregate is as described above.

Hereinafter, an example of the non-aqueous electrolyte secondary battery according to the present embodiment will be described.

Figure 2:
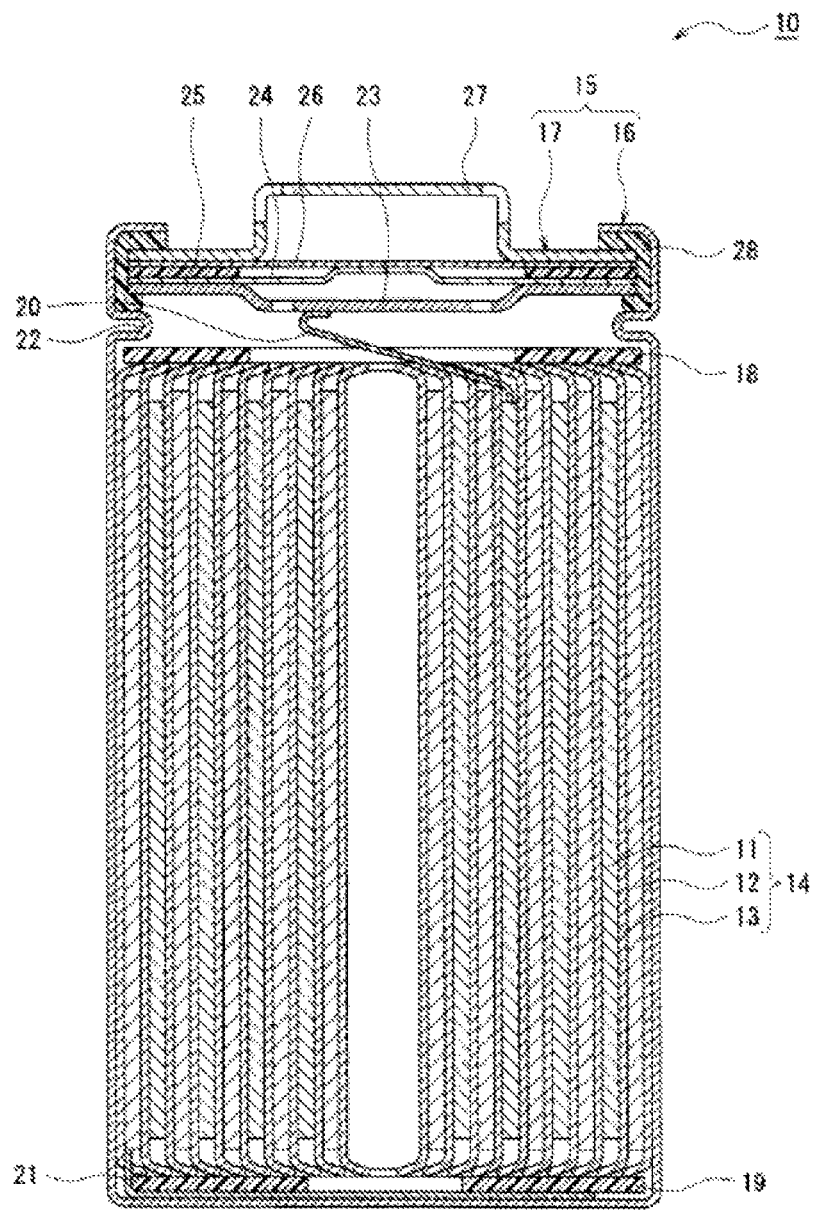
FIG. 2 is a schematic cross-sectional view illustrating a non-aqueous electrolyte secondary battery as an example of an embodiment.

FIG. 2 is a schematic cross-sectional view illustrating a non-aqueous electrolyte secondary battery as an example of an embodiment. A non-aqueous electrolyte secondary battery 10 illustrated in FIG. 2 includes a wound electrode assembly 14 formed by wounding a positive electrode 11 and a negative electrode 12 with a separator 13 interposed therebetween, a non-aqueous electrolyte, insulating plates 18 and 19 that are disposed on upper and lower sides of the electrode assembly 14, respectively, and a battery case 15 housing the members. The battery case 15 includes a bottomed cylindrical case main body 16 and a sealing assembly 17 for closing an opening of the case main body 16. Instead of the wound electrode assembly 14, another form of an electrode assembly such as a stacked electrode assembly in which a positive electrode and a negative electrode are alternately stacked with a separator interposed therebetween may be applied. In addition, examples of the battery case 15 include a metal case having a cylindrical shape, a square shape, a coin shape, a button shape, or the like, and a resin case formed by laminating resin sheets (so-called laminate type resin case).

The case main body 16 is, for example, a bottomed cylindrical metal container. A gasket 28 is provided between the case main body 16 and the sealing assembly 17 to secure a sealing property of the inside of the battery. The case main body 16 has, for example, a projection part 22 in which a part of a side part thereof projects inside for supporting the sealing assembly 17. The projection part 22 is preferably formed in an annular shape along a circumferential direction of the case main body 16, and supports the sealing assembly 17 on an upper surface thereof.

The sealing assembly 17 has a structure in which a filter 23, a lower vent member 24, an insulating member 25, an upper vent member 26, and a cap 27 are sequentially stacked from the electrode assembly 14 side. Each member constituting the sealing assembly 17 has, for example, a disk shape or a ring shape, and the respective members except for the insulating member 25 are electrically connected to each other. The lower vent member 24 and the upper vent member 26 are connected to each other at the respective central parts thereof, and the insulating member 25 is interposed between the respective circumferential parts of the vent members 24 and 26. When the internal pressure of the secondary battery 10 is increased by heat generation due to an internal short circuit or the like, for example, the lower vent member 24 is deformed so as to push the upper vent member 26 up toward the cap 27 side and is broken, and thus, a current pathway between the lower vent member 24 and the upper vent member 26 is cut off. When the internal pressure is further increased, the upper vent member 26 is broken, and gas is discharged through the opening of the cap 27.

In the non-aqueous electrolyte secondary battery 10 illustrated in FIG. 2, a positive electrode lead 20 attached to the positive electrode 11 extends through a through-hole of the insulating plate 18 toward a side of the sealing assembly 17, and a negative electrode lead 21 attached to the negative electrode 12 extends through the outside of the insulating plate 19 toward the bottom side of the case main body 16. The positive electrode lead 20 is connected to a lower surface of the filter 23 that is a bottom plate of the sealing assembly 17 by welding or the like, and the cap 27 that is a top plate of the sealing assembly 17 electrically connected to the filter 23 becomes a positive electrode terminal. The negative electrode lead 21 is connected to a bottom inner surface of the case main body 16 by welding or the like, and the case main body 16 becomes a negative electrode terminal.

The electrode 60 is applied to at least one of the positive electrode 11 and the negative electrode 12. For the separator 13, a porous sheet having an ion permeation property and an insulation property is used. Specific examples of the porous sheet include a fine porous thin film, a woven fabric, and a non-woven fabric. As a material of the separator 13, an olefin-based resin such as polyethylene or polypropylene, cellulose, and the like are preferable. The separator 13 may be a laminate including a cellulose fiber layer and a thermoplastic resin fiber layer formed of an olefin-based resin or the like. In addition, a multi-layer separator including a polyethylene layer and a polypropylene layer may be used, or a separator obtained by applying a material such as an aramid-based resin or ceramic onto a surface of the separator 13 may be used.

The non-aqueous electrolyte contains a non-aqueous solvent and an electrolyte salt dissolved in the non-aqueous solvent. As the non-aqueous solvent, for example, esters, ethers, nitriles, amides, a mixed solvent of two or more thereof, and the like are used. The non-aqueous solvent may contain a halogen-substituted solvent in which at least some hydrogens in these solvents are substituted with halogen atoms such as fluorine. As the electrolyte salt, for example, a lithium salt such as $LiPF_6$ is used.

Next, Examples will be described.

EXAMPLES

Example 1

[Production of Positive Electrode]

100 parts by weight of a positive electrode active material represented by $LiNi_{0.82}Co_{0.15}Al_{0.03}O_2$, 1 part by weight of acetylene black (AB), and 1 part by weight of polyvinylidene fluoride (PVdF) were mixed, and an appropriate amount of N-methyl-2-pyrrolidone (NMP) was further added, thereby preparing a positive electrode mixture slurry. Next, the positive electrode mixture slurry was applied onto both surfaces of a positive electrode current collector formed of an aluminum foil, and the positive electrode current collector was dried. The positive electrode current collector was cut into a predetermined electrode size and was rolled using a roller to form a positive electrode active material layer on the both surfaces of the positive electrode current collector. Next, 5 parts by weight of melamine polyphosphate particles and 1 part by weight of polyvinylidene fluoride (PVdF) were mixed, and 100 mL of N-methyl-2-pyrrolidone (NMP) was further added, thereby preparing a filler slurry. 100 mL of the filler slurry was applied onto the positive electrode active material layer at a Wet film thickness equivalent to 4 μm, and the positive electrode active material layer was dried. The positive electrode active material layer was used as a positive electrode of Example 1.

When a surface of the positive electrode of Example 1 was observed by SEM-EDX, it was confirmed that the shape of the aggregate of the melamine polyphosphate particles was an island shape, and a covering rate of the aggregate of the melamine polyphosphate particles was 5%.

[Production of Negative Electrode]

100 parts by weight of a graphite powder, 1 part by weight of carboxymethyl cellulose (CMC), and 1 part by weight of styrene-butadiene rubber (SBR) were mixed, and an appropriate amount of water was further added, thereby preparing a negative electrode mixture slurry. Next, the negative electrode mixture slurry was applied onto both surfaces of a negative electrode current collector formed of a copper foil, and the negative electrode current collector was dried. The negative electrode current collector was cut into a predetermined electrode size and was rolled using a roller to form a negative electrode active material layer on the both surfaces of the negative electrode current collector.

[Preparation of Non-Aqueous Electrolyte]

Lithium hexafluorophosphate ($LiPF_6$) was dissolved in a mixed solvent obtained by mixing ethylene carbonate (EC), ethyl methyl carbonate (EMC), and dimethyl carbonate (DMC) at a volume ratio of 3:3:4 so that a concentration thereof was 1 mol/liter to prepare a non-aqueous electrolyte.

[Production of Non-Aqueous Electrolyte Secondary Battery]

(1) A positive electrode lead was attached to a positive electrode current collector, a negative electrode lead was attached to a negative electrode current collector, and then, a positive electrode and a negative electrode were wound with a separator formed of polyethylene interposed therebetween, thereby producing a wound electrode assembly.

(2) Insulating plates were disposed on upper and lower sides of the electrode assembly, respectively, a negative electrode lead was welded to a case main body, a positive electrode lead was welded to a sealing assembly, and the electrode assembly was housed in the case main body.

(3) A non-aqueous electrolyte liquid was injected into the case main body by a pressure reduction method, and then, an end part of an opening of the case main body was sealed with the sealing assembly via a gasket. This was used as a non-aqueous electrolyte secondary battery.

Example 2

A non-aqueous electrolyte secondary battery was produced in the same manner as in Example 1, except that the amount of the melamine polyphosphate particles added was 30 parts by weight and 100 mL of the prepared filler slurry was applied onto the positive electrode active material layer at a Wet film thickness equivalent to 6 μm in the preparation of the filler slurry. When a surface of the positive electrode of Example 2 was observed by SEM-EDX, it was confirmed that the shape of the aggregate of the melamine polyphosphate particles was an island shape, and a covering rate of the aggregate of the melamine polyphosphate particles was 65%.

Example 3

A non-aqueous electrolyte secondary battery was produced in the same manner as in Example 1, except that the amount of the melamine polyphosphate particles added was 30 parts by weight and 100 mL of the prepared filler slurry was applied onto the positive electrode active material layer at a Wet film thickness equivalent to 10 μm in the preparation of the filler slurry. When a surface of the positive electrode of Example 3 was observed by SEM-EDX, it was confirmed that the shape of the aggregate of the melamine polyphosphate particles was an island shape, and a covering rate of the aggregate of the melamine polyphosphate particles was 90%.

Examples 4 to 6

Non-aqueous electrolyte secondary batteries of Examples 4, 5, and 6 were produced in the same manners as in Examples 1, 2, and 3, respectively, except that the melamine polyphosphate particles were replaced with ammonium polyphosphate particles in the preparation of the filler slurry. When surfaces of the positive electrodes of Examples 4 to 6 were observed by SEM-EDX, it was confirmed that the shape of each of the aggregates of the ammonium polyphosphate particles was an island shape, and covering rates of the aggregates of the ammonium polyphosphate particles were 5%, 65%, and 90%, respectively.

Examples 7 to 9

Non-aqueous electrolyte secondary batteries of Examples 7, 8, and 9 were produced in the same manners as in Examples 1, 2, and 3, respectively, except that the melamine polyphosphate particles were replaced with lithium metaphosphate $((LiPO_3)_n)$ particles in the preparation of the filler slurry. When surfaces of the positive electrodes of Examples 7 to 9 were observed by SEM-EDX, it was confirmed that the shape of each of the aggregates of the lithium metaphosphate particles was an island shape, and covering rates of the aggregates of the lithium metaphosphate particles were 5%, 65%, and 90%, respectively.

Examples 10 to 12

Non-aqueous electrolyte secondary batteries of Examples 10, 11, and 12 were produced in the same manners as in Examples 1, 2, and 3, respectively, except that the melamine polyphosphate particles were replaced with sodium silicate $(Na_2SiO_3)$ particles in the preparation of the filler slurry. When surfaces of the positive electrodes of Examples 10 to 12 were observed by SEM-EDX, it was confirmed that the shape of each of the aggregates of the sodium silicate particles was an island shape, and covering rates of the aggregates of the sodium silicate particles were 5%, 65%, and 90%, respectively.

Examples 13 to 15

Non-aqueous electrolyte secondary batteries of Examples 13, 14, and 15 were produced in the same manners as in Examples 1, 2, and 3, respectively, except that the melamine polyphosphate particles were replaced with sodium borate $(Na_2B_4O_7)$ particles in the preparation of the filler slurry. When surfaces of the positive electrodes of Examples 13 to 15 were observed by SEM-EDX, it was confirmed that the shape of each of the aggregates of the sodium borate particles was an island shape, and covering rates of the aggregates of the sodium borate particles were 5%, 65%, and 90%, respectively.

Comparative Example 1

A non-aqueous electrolyte secondary battery was produced in the same manner as in Example 1, except that the filler slurry was not used.

Comparative Example 2

A non-aqueous electrolyte secondary battery was produced in the same manner as in Example 1, except that the amount of the melamine polyphosphate particles added was 30 parts by weight and 100 mL of the prepared filler slurry was applied onto the positive electrode active material layer at a Wet film thickness equivalent to 15 μm in the preparation of the filler slurry.

Comparative Examples 3 to 6

Non-aqueous electrolyte secondary batteries were produced in the same manner as in Comparative Example 2, except that the melamine polyphosphate particles were replaced with ammonium polyphosphate particles in Comparative Example 3, lithium metaphosphate particles in Comparative Example 4, sodium silicate particles in Comparative Example 5, and sodium borate particles in Comparative Example 6 in the preparation of the filler slurry.

When surfaces of the positive electrodes of Comparative Examples 2 to 6 were observed by SEM-EDX, the island-shaped aggregates of the filler particles ware not confirmed, and covering rates of the aggregates of the filler particles were 100%.

[Nail Penetration Test]

The non-aqueous electrolyte secondary batteries of Examples 1 to 15 and Comparative Examples 1 to 6 were subjected to a nail penetration test in the following procedure.

(1) Under an environment of 25° C., charging was performed at a constant current of 600 mA until a battery voltage reached 4.2 V, and then, charging was continuously performed at a constant voltage until a current value reached 90 mA.

(2) Under an environment of 25° C., a tip of a round nail having a thickness of 2.7 mmφ was brought into contact with the central part of a side surface of the battery charged in (1), the round nail penetrated in a stacking direction of the electrode assembly in the battery at a speed of 1 mm/sec, and the penetration of the round nail was stopped immediately after a battery voltage drop due to an internal short circuit was detected.

(3) A temperature of a surface of the battery was measured 1 minute after a short circuit of the battery was started by the round nail. The measured temperature was summarized in Table 1 as the temperature after the nail penetration test.

[Battery Resistance]

The battery resistance of each of the non-aqueous electrolyte secondary batteries of Examples 1 to 15 and Comparative Examples 1 to 6 was measured as follows. Under a temperature environment of 25° C., the non-aqueous electrolyte secondary battery was charged at a constant current of 0.3 C until the battery voltage reached 4.2 V, the non-aqueous electrolyte secondary battery was charged at a constant voltage until the current value reached 0.05 C, and then, the non-aqueous electrolyte secondary battery was discharged at a constant current of 0.3 C to set SOC to 50%. Next, voltage values when discharge currents of 0 A, 0.1 A, 0.5 A, and 1.0 A were applied for 10 seconds were acquired. DC-IR was calculated from an absolute value of a slope when the voltage value after 10 seconds to each discharge current value was linearly approximated by a least-square method, and the value was summarized in Table 1 as the battery resistance.

TABLE 1

| | Filler particles | Covering rate of aggregate (%) | Battery resistance (mΩ) | Temperature after nail penetration test (° C.) |
|---|---|---|---|---|
| Example 1 | Melamine | 5 | 79 | 55 |
| Example 2 | polyphosphate | 65 | 83 | 60 |
| Example 3 | | 90 | 90 | 40 |
| Example 4 | Ammonium | 5 | 78 | 50 |
| Example 5 | polyphosphate | 65 | 82 | 45 |
| Example 6 | | 90 | 85 | 30 |
| Example 7 | Lithium | 5 | 82 | 60 |
| Example 8 | metaphosphate | 65 | 84 | 50 |
| Example 9 | $(LiPO_3)_n$ | 90 | 93 | 55 |
| Example 10 | Sodium silicate | 5 | 80 | 60 |
| Example 11 | $Na_2SiO_3$ | 65 | 88 | 50 |
| Example 12 | | 90 | 90 | 50 |
| Example 13 | Sodium borate | 5 | 81 | 70 |
| Example 14 | $Na_2B_4O_7$ | 65 | 83 | 60 |
| Example 15 | | 90 | 92 | 55 |
| Comparative Example 1 | None | 0 | 80 | 100 |
| Comparative Example 2 | Melamine polyphosphate | 100 | 120 | 45 |
| Comparative Example 3 | Ammonium polyphosphate | 100 | 110 | 30 |
| Comparative Example 4 | Lithium metaphosphate $(LiPO_3)_n$ | 100 | 130 | 45 |
| Comparative Example 5 | Sodium silicate $Na_2SiO_3$ | 100 | 150 | 45 |
| Comparative Example 6 | Sodium borate $Na_2B_4O_7$ | 100 | 160 | 50 |

As shown in Table 1, in all of Examples 1 to 15 in which the aggregate of the filler particles was present in an island shape on the surface of the positive electrode active material layer, the battery temperature after the nail penetration test was lower than that in Comparative Example 1 in which the filler particles were absent on the surface of the positive electrode active material layer. Here, when the covering rate of the aggregate of the filler particles was 100% as in Comparative Examples 2 to 6, the battery resistance was significantly increased in comparison to Comparative Example 1. However, in Examples 1 to 15, an increase in battery resistance was suppressed in comparison to Comparative Examples 2 to 6. That is, in Examples 1 to 15, an increase in battery resistance was suppressed, and heat generation of the battery in the nail penetration test was suppressed.

Examples 16 to 30

Non-aqueous electrolyte secondary batteries of Examples 16 to 30 were produced in the same manners as in Examples 1 to 15, respectively, except that the filler slurry was applied onto the negative electrode active material layer instead of being applied onto the positive electrode active material layer.

Comparative Examples 7 to 10

Non-aqueous electrolyte secondary batteries of Comparative Examples 7 to 10 were produced in the same manners as in Comparative Examples 2 to 6, respectively, except that the filler slurry was applied onto the negative electrode active material layer instead of being applied onto the positive electrode active material layer.

The covering rates of the aggregates of the filler particles in Examples 16 to 30 and Comparative Examples 7 to 10 are summarized in Table 2. In addition, in the non-aqueous electrolyte secondary batteries of Examples 16 to 30 and Comparative Examples 7 to 10, the nail penetration test and the battery resistance measurement were performed. The results thereof are summarized in Table 2.

TABLE 2

| | Filler particles | Covering rate of aggregate (%) | Battery resistance (mΩ) | Temperature after nail penetration test (° C.) |
|---|---|---|---|---|
| Example 16 | Melamine | 5 | 80 | 60 |
| Example 17 | polyphosphate | 65 | 82 | 55 |
| Example 18 | | 90 | 85 | 55 |
| Example 19 | Ammonium | 5 | 82 | 45 |
| Example 20 | polyphosphate | 65 | 83 | 40 |
| Example 21 | | 90 | 88 | 40 |
| Example 22 | Lithium | 5 | 78 | 50 |
| Example 23 | metaphosphate | 65 | 77 | 55 |
| Example 24 | $(LiPO_3)_n$ | 90 | 87 | 45 |
| Example 25 | Sodium silicate | 5 | 80 | 50 |
| Example 26 | $Na_2SiO_3$ | 65 | 84 | 50 |
| Example 27 | | 90 | 92 | 55 |
| Example 28 | Sodium borate | 5 | 82 | 40 |
| Example 29 | $Na_2B_4O_7$ | 65 | 84 | 50 |
| Example 30 | | 90 | 95 | 60 |
| Comparative Example 7 | Melamine polyphosphate | 100 | 110 | 50 |
| Comparative Example 8 | Ammonium polyphosphate | 100 | 105 | 45 |
| Comparative Example 9 | Lithium metaphosphate $(LiPO_3)_n$ | 100 | 120 | 50 |
| Comparative Example 10 | Sodium silicate $Na_2SiO_3$ | 100 | 130 | 60 |
| Comparative Example 11 | Sodium borate $Na_2B_4O_7$ | 100 | 130 | 60 |

As can be seen from Table 2, the results of the negative electrode were similar to those of the positive electrode. That is, in Examples 16 to 30, an increase in battery resistance was suppressed, and heat generation of the battery in the nail penetration test was suppressed.

Examples 31 to 40

Non-aqueous electrolyte secondary batteries were produced in the same manner as in Example 1, except that the melamine polyphosphate particles were replaced with sodium tripolyphosphate particles in Example 31, potassium phosphate ($KH_2PO_4$) particles in Example 32, melamine cyanurate in Example 33, potassium pyrosulfate ($K_2S_2O_7$) particles in Example 34, boron oxide ($B_2O_3$) particles in Example 35, ethylene-1,2-bis(pentabromophenyl) particles in Example 36, ethylenebistetrabromophthalimide particles in Example 37, potassium citrate ($C_6H_5K_3O_7$) particles in Example 38, potassium carbonate ($K_2CO_3$) particles in Example 39, and sodium carbonate ($Na_2CO_3$) particles in Example 40 in the preparation of the filler slurry.

The covering rates of the aggregates of the filler particles in Examples 31 to 40 are summarized in Table 3. In addition, in the non-aqueous electrolyte secondary batteries of Examples 31 to 40, the nail penetration test and the battery resistance measurement were performed. The results thereof are summarized in Table 3.

TABLE 3

| | Filler particles | Covering rate of aggregate (%) | Battery resistance (mΩ) | Temperature after nail penetration test (° C.) |
|---|---|---|---|---|
| Example 31 | Sodium tripolyphosphate | 5 | 82 | 50 |
| Example 32 | Potassium phosphate $KH_2PO_4$ | 5 | 88 | 53 |
| Example 33 | Melamine cyanurate | 5 | 85 | 52 |
| Example 34 | Potassium pyrosulfate $K_2S_2O_7$ | 5 | 81 | 58 |
| Example 35 | Boron oxide $B_2O_3$ | 5 | 78 | 65 |
| Example 36 | Ethylene-1,2-bis (pentabromophenyl) | 5 | 81 | 60 |
| Example 37 | Ethylenebistetrabromophthalimide | 5 | 80 | 60 |
| Example 38 | Potassium citrate $C_6H_5K_3O_7$ | 5 | 82 | 56 |
| Example 39 | Potassium carbonate $K_2CO_3$ | 5 | 83 | 53 |
| Example 40 | Sodium carbonate $Na_2CO_3$ | 5 | 84 | 59 |

In all of Examples 31 to 40, the battery temperature after the nail penetration test was lower than that in Comparative Example 1 in which the filler particles were absent on the surface of the positive electrode active material layer. In addition, the battery resistance was higher than that of Comparative Example 1, but was the same as that of Example 1. That is, also in Examples 31 to 40, an increase in battery resistance was suppressed, and heat generation of the battery in the nail penetration test was suppressed.

REFERENCE SIGNS LIST

10 Non-aqueous electrolyte secondary battery
11 Positive electrode
12 Negative electrode
13 Separator
14 Electrode assembly
15 Battery case
16 Case main body
17 Sealing assembly
18, 19 Insulating plate
20 Positive electrode lead
21 Negative electrode lead
22 Projection part
23 Filter
24 Lower vent member
25 Insulating member
26 Upper vent member
27 Cap
28 Gasket
60 Electrode
62 Current collector
64 Active material layer
66 Aggregate

The invention claimed is:

1. An electrode for a non-aqueous electrolyte secondary battery comprising:
a current collector; an active material layer that is formed on the current collector; and
aggregates of filler particles that are present in an island shape on a surface of the active material layer,
wherein the filler particles are compound particles containing at least one of phosphorus, silicon, boron, nitrogen, potassium, sodium, and bromine, and a transformation point of the filler particle at which the filler particle is transformed from a solid phase into a liquid phase or is thermally decomposed is in a range of 180° C. to 1,000° C.,
a covering rate of the aggregates to the surface of the active material layer is 90% or less,
the filler particles contain at least one of melamine polyphosphate, ammonium polyphosphate, lithium metaphosphate, sodium silicate, sodium borate, sodium tripolyphosphate, potassium phosphate, melamine cyanurate, potassium pyrosulfate, ethylene-1,2-bis(pentabromophenyl), ethylenebistetrabromophthalimide, potassium citrate, potassium carbonate, and sodium carbonate, and
the number of the aggregates having an area of 1,000 μm² or less is 80% or more with respect to a total number of the aggregates.

2. The electrode for a non-aqueous electrolyte secondary battery according to claim 1, wherein a covering rate of the aggregate to the surface of the active material layer is 5% or more.

3. The electrode for a non-aqueous electrolyte secondary battery according to claim 1, wherein the number of the aggregates is 100 or more per 1 $mm^2$.

4. The electrode for a non-aqueous electrolyte secondary battery according to claim 1, wherein an average particle diameter of the filler particles is 0.1 µm to 20 µm.

5. The electrode for a non-aqueous electrolyte secondary battery according to claim 1, wherein the filler particles further contain boron oxide.

6. The electrode for a non-aqueous electrolyte secondary battery according to claim 1, wherein the aggregate contains a binder, and the binder contains at least one of polyvinylidene fluoride (PVdF), ethylene dimethacrylate, allyl methacrylate, t-dodecyl mercaptan, α-methylstyrene dimer, and methacrylic acid.

7. A non-aqueous electrolyte secondary battery comprising:
a positive electrode; and a negative electrode,
wherein at least one of the positive electrode and the negative electrode is the electrode for a non-aqueous electrolyte secondary battery according to claim 1.

* * * * *